(12) United States Patent
Van Der Heide (10) Patent No.: US 10,759,492 B2
(45) Date of Patent: Sep. 1, 2020

(54) ADAPTER FOR BICYCLE PEDAL (71) Applicant: Marten Peter Van Der Heide, Amstelveen (NL)

(72) Inventor: Marten Peter Van Der Heide, Amstelveen (NL)

(73) Assignee: Marten Peter Van Der Heide, Amstelveen (NL)

( * ) Notice: Subject to any disclaimer, the term of this patent is extended or adjusted under 35 U.S.C. 154(b) by 0 days.

(21) Appl. No.: 16/462,373

(22) PCT Filed: Nov. 20, 2017

(86) PCT No.: PCT/NL2017/050756
§ 371 (c)(1),
(2) Date: May 20, 2019

(87) PCT Pub. No.: WO2018/093266
PCT Pub. Date: May 24, 2018

(65) Prior Publication Data
US 2019/0367126 A1 Dec. 5, 2019

(30) Foreign Application Priority Data
Nov. 21, 2016 (NL) ..................................... 2017831

(51) Int. Cl.
*B62M 3/08* (2006.01)
*A43B 5/14* (2006.01)
*B62M 3/16* (2006.01)

(52) U.S. Cl.
CPC ............ *B62M 3/086* (2013.01); *B62M 3/083* (2013.01); *A43B 5/14* (2013.01); *B62M 3/16* (2013.01)

(58) Field of Classification Search
CPC ........ B62M 3/086; B62M 3/083; B62M 3/16; A43B 5/14
See application file for complete search history.

(56) References Cited

U.S. PATENT DOCUMENTS 3,859,867 A * 1/1975 Haines ..................... B62M 3/08
74/563
5,806,379 A * 9/1998 Nagano .................. B62M 3/086
36/131

(Continued)

FOREIGN PATENT DOCUMENTS

FR     2801273 A1   5/2001
WO   89/02625 A1   3/1989

(Continued)

OTHER PUBLICATIONS

Netherlannds Priority Search Report and Written Opinion, dated Nov. 21, 2016; NL2017830.

(Continued)

*Primary Examiner* — Vicky A Johnson (57) ABSTRACT

The present invention relates to a bicycle pedal adapter configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle pedal adapter is flat, wherein the bicycle pedal adapter comprises a main body having a height, a width and a length, wherein the width is more than four times the height and wherein the length is more than five times the height, and wherein the main body has a front end and a rear end, the bicycle pedal adapter comprising:—a front coupling at the front end, the front coupling being configured to mate with a front clamping member of the bicycle pedal and—a rear coupling at the rear end, the rear coupling being configured to mate with a rear clamping member of the bicycle pedal, and wherein the bicycle pedal adapter is configured to be clicked onto the bicycle pedal and to be uncoupled from the bicycle pedal, and wherein the bicycle pedal adapter comprises a foot support surface which faces (Continued)

upwards, wherein the main body does not comprise a plurality of coupling holes via which the bicycle pedal adapter can be connected to a bicycle shoe via a connecting member.

20 Claims, 8 Drawing Sheets

(56) References Cited

U.S. PATENT DOCUMENTS

| | | | |
|---|---|---|---|
| 2013/0074647 A1 | 3/2013 | Swift | |
| 2014/0060242 A1* | 3/2014 | Thom | B62M 3/08 74/594.4 |
| 2018/0154979 A1* | 6/2018 | Bjornsson | B62M 3/083 |
| 2019/0367126 A1* | 12/2019 | Van Der Heide | B62M 3/083 |

FOREIGN PATENT DOCUMENTS

| | | | | |
|---|---|---|---|---|
| WO | WO-9947987 A1 * | 9/1999 | | B62M 3/086 |
| WO | WO-2019036515 A1 * | 2/2019 | | B62M 3/086 |

OTHER PUBLICATIONS

International Search Report and Written Opinion dated Apr. 11, 2018; PCT/NL2017/050756.
International Preliminary Search on Patentability; dated Mar. 11, 2019; Appln. No. PCT/NL2017/050756.

* cited by examiner

ADAPTER FOR BICYCLE PEDAL

FIELD OF THE INVENTION

The present invention relates to a bicycle pedal adapter for use during cycling with regular shoes.

BACKGROUND OF THE INVENTION

Cycling has become a popular form of transportation for recreational as well as commuting purposes. Many bicycles, especially in the field of speed cycling, comprise step-in or clipless pedals. Said pedals are constructed to releasably engage a cleat that is mounted on the sole of a bicycle shoe. Said pedals roughly come in two types. The first type has cleat engagement mechanisms on both sides. This type is commonly used for off-road bikes. The second type has the engagement mechanism on just one side of the pedal. This second type is typically used on road-racing bicycles. The present invention mainly relates to the second type.

It was recognized in the present invention that without the correct cleats and shoes it is rather inconvenient to cycle with the said clipless bicycle pedals. Cycling with regular shoes and no cleats is therefore not recommended. When a user does desire to cycle with his regular shoes on, he or she could switch between regular pedals and clipless pedals. This is however highly cumbersome, because it requires changing the pedals of a bike.

It is possible to use the more flatter underside of the pedal. Although this is a possibility, it is rather unsafe on rainy days when the pedal becomes slippery. In addition, both sides of the pedal are not flat and do not offer much grip. Moreover, the centre of gravity of the pedal is such that the pedal rotates to a stable orientation in which the underside faces away from a direction of approach of the shoe of the rider. Therefore, it is very difficult to engage the underside with the shoe.

A cleat adapter that solves the abovementioned problem of cycling with regular shoes and clipless pedals is known, such as published under number US2016052593 (A1). In the disclosed construction, however, the centre of gravity of the pedal and cleat adapter assembly is negatively influenced by the cleat adapter. The bicycle pedal itself is designed to move to a predetermined, substantially vertical orientation when it is not engaged with a cleat. This standard and stable orientation helps the cyclist to easily engage the pedal with the cleat on his or her shoe in a routinely manner. The so called Fly Pedals of the abovementioned publication influence this standard, stable orientation, thereby increasing the difficulty level of placing a regular shoe on the correct side of the pedal. Another disadvantage of the Fly Pedals is the difficult manual decoupling of the Fly Pedal from the pedal, as experienced by its users. In addition, the user has to buy an extra pair of normal cleats, because the Fly Pedals are mounted on a normal cleat. Alternatively, the user has to change the cleats between cycling with shoes having cleats and cycling with the Fly Pedals. The latter option more or less defeats the purpose of the Fly Pedal.

Other bicycle pedal adapters exist which have parts which extend to below the bicycle pedal. The bikedap (www.bikedaps.com) is an example of such pedal adapters. These bicycle pedal adapters have a disadvantage in that they are quite large and bulky. Furthermore, these pedal adapters provide a foot support surface which is positioned too far to the rear instead of at the axis about which the pedal rotates. This results in a low quality user experience.

Finally, one could use the shoe cleat adapters themselves. However, they are not designed to be manually decoupled from the bicycle pedal. It requires quite some strength to remove these existing shoe cleat adapters by hand which could lead to injuries in the process. Also the concave and small foot support surface of the shoe cleat adapters do not make this a suitable alternative.

OBJECT OF THE INVENTION

It is an object of the invention to provide an improvement upon the known cleat adapters for cycling with regular shoes in combination with clipless bicycle pedals.

Another object of the invention is to provide a bicycle pedal adapter that can be both manually and easily coupled to and decoupled from a clipless bicycle pedal.

Yet another object of the invention is to provide a bicycle pedal adapter that can be easily manufactured.

Yet another object of the invention is to provide a bicycle pedal adapter that can be safely used, also when it is wet or in case of dirty conditions.

SUMMARY OF THE INVENTION

In order to achieve at least one object, a bicycle pedal adapter is provided to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle pedal adapter is flat, wherein the bicycle pedal adapter comprises a main body having a height, a width and a length, wherein the width is more than four times the height and wherein the length is more than five times the height, and wherein the main body has a front end and a rear end, the bicycle pedal adapter comprising:

a front coupling at the front end, the front coupling being configured to mate with a front clamping member of the bicycle pedal and a rear coupling at the rear end, the rear coupling being configured to mate with a rear clamping member of the bicycle pedal, and wherein the bicycle pedal adapter is configured to be clicked onto the bicycle pedal and to be uncoupled from the bicycle pedal, and wherein the bicycle pedal adapter comprises a foot support surface which faces upwards, wherein the main body does not comprise a plurality of coupling holes via which the bicycle pedal adapter can be connected to a bicycle shoe via a connecting member.

The bicycle pedal adapter provides an advantage in that it can be easily clicked onto the pedal and can easily convert the pedal from a pedal for a shoe with a cleat to a pedal which is suitable for a normal shoe. The flat shape of the bicycle pedal adapter has the benefit that the centre of gravity of the pedal including the bicycle pedal adapter is located in substantially the same area as the pedal without the adapter. This ensures that the stable orientation of the pedal stays substantially the same and allows an easy engagement of the pedal with the foot of the user. The foot support surface is defined by the main body and in top view may have a same size and shape as the main body.

In an embodiment, the bicycle pedal adapter is a single integral body. This allows the manufacturing to be as simple as possible.

The bicycle pedal adapter may have no moving parts.

In an embodiment, the bicycle pedal adapter is an integral body of a single material. Alternatively the bicycle pedal adapter may be an integral body of a single material having only an antislip material on the foot support surface and no other materials.

In an embodiment, the single material is plastic, aluminium or titanium. These materials offer good strength and stiffness to weight ratios, resulting in a lightweight bicycle pedal adapter.

In an embodiment, the material from which the bicycle pedal adapter is made has a density of less than 4 g/cm3, preferably less than 2 g/cm3.

The bicycle pedal adapter may be rigid.

The bicycle pedal adapter may have a total weight of less than 50 gram, in particular less than 40 gram, more in particular less than 30 gram.

In an embodiment, the rear end comprises stopping sections, wherein the stopping sections are integrally connected to the main body and comprise triangular shaped sections, when viewed in top view, extending away from the main body under an angle α. The stopping sections prevents undesired pivoting of the bicycle pedal adapters during cycling. The stopping sections have a second purpose, which is to bias the rear clamping member of the bicycle pedal during pivoting of the adapter. This provides the required space above the engagement surface for removing the adapter. The skilled person will recognize that the triangular shaped sections may have rounded corners or sides which are slightly curved.

The angle α may lie between 10 and 45 degrees, more in particular between 20 and 30 degrees. This advantageously allows uncoupling with low strength.

In an embodiment, the stopping sections follow the contour of the rear clamping member.

In an embodiment, the front coupling comprises a first protrusion which extends in a downward and forward direction from the main body of the bicycle pedal adapter.

Even when the first protrusion is taken into account, the bicycle pedal adapter has a flat shape. Flat in this context means that the pedal adapter is clipless, i.e. does not have a toe-clip. A length of the bicycle pedal adapter is more than 3 times a height of the bicycle pedal adapter. A width of the bicycle pedal adapter is more than 3 times a height of the bicycle pedal adapter. In this way, the centre of gravity of the assembly of pedal and bicycle pedal adapter does not change very much and the resulting stable orientation is suitable for a user to engage the pedal with the bicycle pedal adapter without difficulty.

In an embodiment, the front coupling weighs less than 15 grams.

In an embodiment, the bicycle pedal adapter does not have any other part protruding downward from the main body except the front coupling. In an embodiment, the bicycle pedal adapter does not engage a bottom side of the bicycle pedal and is not attached to the bottom side of the bicycle pedal.

In an embodiment, the first protrusion has a shape of a part of a circle, in particular a semi-circular shape when viewed in bottom view.

In an embodiment, the rear coupling comprises a second protrusion which in top view is located between the stopping sections, and wherein in top view the second protrusion extends rearward from a main body of the bicycle pedal adapter, wherein in rear view the second protrusion is provided at a lower half of the bicycle pedal adapter, wherein a height of the second protrusion is less than half of a height of the bicycle pedal adapter, wherein the second protrusion is configured to mate with the rear clamping member.

In an embodiment, an upper side of the second protrusion comprises an engagement surface.

In an embodiment, when viewed in top view the second protrusion has a curved shape wherein an apex of the curve is located on a vertical longitudinal midplane of the bicycle pedal adapter.

The present invention provides a smaller engagement surface compared to existing shoe cleat adapters such as provided by Shimano and Look. This has the advantage that, in combination with the curved shape, the bicycle pedal adapter can be removed more easily by hand. The existing shoe cleat adapters require more strength of the user.

In an embodiment, the rear coupling comprises a guiding surface at a lower section of the second protrusion when viewed in cross-sectional side view. The guiding surface smoothly guides the rear end over the rear clamping member of the bicycle pedal.

In an embodiment, the bicycle pedal adapter is when viewed in top view substantially symmetric about a vertical longitudinal midplane. Having symmetric, and thereby identical products is most efficient for manufacturing, for only one mould has to be made. It is also easier for the user, as the user does not have to worry about which bicycle pedal adapter matches the left or the right bicycle pedal.

In side view the bicycle pedal adapter may have a substantially flat foot support surface.

In side view the foot support surface may follow a straight line.

In side view the bicycle pedal adapter may have a substantially flat bottom side.

In side view the main body may increase in height from the front end to the rear end.

In an embodiment, the main body has a height of less than 15 mm.

In an embodiment, the bicycle pedal adapter is manufactured with injection moulding. As the present invention is suited for mass-production due to its simplicity, injection moulding provides a cheap manufacturing solution.

In an embodiment, the foot support surface is textured or provided with anti-slip material, for instance as an inlay. This results in more control during cycling, also in wet conditions or when dirt becomes attached to the bicycle pedal adapter.

In an embodiment, at least one hole or recess is provided in the bicycle pedal adapter, in particular in a side of the bicycle pedal adapter, wherein the at least one hole or recess is configured to be engaged by a decoupling tool.

The decoupling tool may be a screwdriver or any other tool that fits the hole or recess.

In an embodiment, the at least one hole or recess is provided in a side and extends in particular from one side to the opposite side.

In an embodiment, the hole or recess is positioned in a rear part of the main body. That position has the advantage that the moment arm for pivoting the bicycle pedal adapter is the biggest, thereby decreasing the required user strength for removing the bicycle pedal adapter.

In bottom view and/or top view the rear end may have a substantially W-shape.

In an embodiment, the bicycle pedal adapter is configured to be decoupled by firstly pivoting the bicycle pedal adapter around a pivot axis which extends perpendicular to the foot support surface.

In an embodiment, the first protrusion has an upwardly facing support surface and a forwardly facing support surface, wherein the upwardly facing support surface and the forwardly facing support surface meet along a pivot line which defines a front pivot axis The front pivot axis allows the rear side of the bicycle pedal adapter to be raised during the decoupling.

In an embodiment, the bicycle pedal adapter has a vertical left side and vertical right side. The skilled person will recognize that vertical in this context means: substantially vertical.

In an embodiment, in top view a rear part of the main body has a uniform width, and a front part of the main body has a width which decreases toward a front end of the main body. The words uniform width in this context mean "substantially uniform width". In other words, the rear part may have a width which slightly decreases toward the front end of the main body. The front part of the main body tapers toward the front end. The left and right sides of the front part of the main body may be curved when seen in top view. A transition between the front part and the rear part of the main body may be gradual.

The invention further relates to an assembly of the bicycle pedal adapter and a crank with a bicycle pedal having a cleat coupling, wherein the cleat coupling comprises a front clamping member which mates with the front coupling and a rear clamping member which mates with the rear coupling and a central support section on which a main body of the bicycle pedal adapter rests.

In an embodiment, the bicycle pedal adapter extends between the front end and the rear end of the bicycle pedal.

In an embodiment, the bicycle pedal adapter extends over the front clamping member of the bicycle pedal.

In an embodiment, the foot support surface of the main body is substantially flush with the bicycle pedal. This has the advantage that the surface of the bicycle pedal itself is also engaged by the shoe of the user, thereby increasing the foot support surface.

In an embodiment, the foot support surface extends maximum 5 mm above a plane defined by the front and rear clamping members.

In an embodiment, the front coupling is configured to mate with a front clamping member of the bicycle pedal.

In an embodiment, the front coupling has a width substantially equal to a distance from one inner side of the front clamping member to the opposite inner side of the front clamping member. This has the advantage that lateral movements of the bicycle pedal adapter are restricted.

In an embodiment, the bicycle pedal adapter comprises a guiding surface between the rear end and a bottom side, wherein the guiding surface is configured to guide the bicycle pedal adapter smoothly over an edge of the rear clamping member of the bicycle pedal.

In an embodiment, the rear coupling comprises a second protrusion which in top view is located between the stopping sections, and wherein in top view the second protrusion extends rearward from a main body of the bicycle pedal adapter, wherein in rear view the second protrusion is provided at a lower half of the bicycle pedal adapter, wherein a height of the second protrusion is less than half of a height of the bicycle pedal adapter, wherein the second protrusion is configured to mate with the rear clamping member, wherein an upper side of the second protrusion comprises an engagement surface, and wherein the engagement surface is configured to be engaged by the rear clamping member.

In an embodiment, the engagement surface is configured to be engaged by the rear clamping member.

In an embodiment, the foot support surface of the bicycle pedal adapter has a width at its widest portion which is equal to the width of the bicycle pedal or is larger than the width of the bicycle pedal, in which case the foot support surface extends outwardly over a distance of 0-5 mm to the left and to the right beyond the bicycle pedal.

In an embodiment, the bicycle pedal adapter is configured to be decoupled by manually pivoting the rear clamping member, thereby providing the required space for the bicycle pedal adapter to be pivoted about the pivot area.

In an embodiment, the bicycle pedal adapter comprises a hole or recess in the left side and right side in which a decoupling tool can be inserted for decoupling the bicycle pedal adapter from the bicycle pedal.

In an embodiment, the bicycle pedal adapter does not have a substantial effect on the centre of gravity of the bicycle pedal when attached. The bicycle pedal is constructed to pivot to a standard orientation, wherein the standard orientation is defined by an angle θ. The standard orientation helps the cyclist to engage the bicycle pedal in the same way every time he starts from a standstill. Because the bicycle pedal adapter does not substantially influence the standard orientation, the cyclist is able to routinely engage the assembly of bicycle pedal and bicycle pedal adapter, without having to worry about engaging the correct side of the bicycle pedal.

In an embodiment, the guiding surface is configured to smoothly bias the rear clamping member in a rearward direction when the bicycle pedal is clicked onto the pedal.

In an embodiment, the pedal is free to rotate relative to the crank and wherein in side view the pedal and bicycle pedal adapter together rotate to a stable orientation under the influence of gravity, wherein in the stable orientation in side view the foot support surface defines an angle θ of 0-60 degrees relative to a vertical axis, more in particular 25-45 degrees.

The present invention further relates to a method for clicking the bicycle pedal adapter onto a pedal having a cleat coupling, the method comprising:
  a) inserting the front coupling of the bicycle pedal adapter under a front part of the cleat coupling,
  b) pivoting the rear clamping member of the bicycle pedal rearward, thereby creating space for the second protrusion,
  c) engaging the bottom side of the bicycle pedal adapter with a central bearing portion of the pedal, wherein the rear coupling of the bicycle pedal adapter is inserted underneath the rear clamping member of the bicycle pedal,
  d) pivoting the rear clamping member of the bicycle pedal back to its initial position thereby fixing the bicycle pedal adapter to the pedal.

In an embodiment, step b) of the above described method comprises pushing a guiding surface against an edge of the rear clamping member, causing the rear clamping member to move rearward.

The present invention further relates to a method for decoupling the bicycle pedal adapter onto a pedal having a cleat coupling, the method comprising reversing the steps of the abovementioned method.

The present invention further relates to a method for decoupling the bicycle pedal adapter from the bicycle pedal, the method comprising:
  a) inserting a decoupling tool in the hole or recess of the bicycle pedal adapter,
  b) pivoting the bicycle pedal adapter about a pivot axis which extends perpendicular to the foot support surface by pulling the decoupling tool in a first direction, c) engaging the rear clamping member with a stopping section, thereby pivoting the rear clamping member backwards, providing space for the rear coupling to move upward, d) pulling the decoupling tool in a second direction, wherein the second direction is substantially perpendicular to the central support section 4 of the bicycle pedal, thereby removing the bicycle pedal adapter from the pedal.

The present invention further relates to a method for decoupling the bicycle pedal adapter from the bicycle pedal, the method comprising:

a) engaging an outer side of a rear part of a main body of the bicycle pedal adapter with a hand of a user, b) pivoting the bicycle pedal adapter, in particular about a vertical pivot axis by manually pushing on the outer side, thereby engaging the rear clamping member with one of the stopping sections, and pivoting the rear clamping member to the rear by pushing the stopping section against it, c) lifting the rear end up with another hand of the user, thereby pivoting the bicycle pedal adapter about a front pivot axis, d) removing the bicycle pedal adapter from the bicycle pedal.

These and other aspects of the invention will be more readily appreciated as the same becomes better understood by reference to the following detailed description and considered in connection with the accompanying drawings in which like reference symbols designate like parts.

In the present invention it was recognized that the rear clamping member can be accessed by hand and therefore be utilized for the removal of the bicycle pedal adapter. The shoe attached to a cleat adapter prevents access to the rear clamping member. It can therefore only be removed by pivoting the shoe.

DETAILED DESCRIPTION OF THE FIGURES

Turning to FIGS. 1, 4, 5 and 8, a bicycle pedal adapter 10 according to the invention is shown. The bicycle pedal adapter is configured to be clicked onto a bicycle pedal 100 which is intended and constructed to be used for a bicycle shoe having a cleat. The bicycle pedal adapter is configured to convert the bicycle pedal to a bicycle pedal suitable to be used with a normal shoe without a cleat.

The bicycle pedal adapter comprises a main body 18 having a height 12, a width 14 and a length 16. The main body is flat. The width 14 is more than four times the height 12 and the length 16 is more than five times the height. The height 12 is generally less than 15 mm, in particular less than 13 mm. The main body 18 has a front end 20 and a rear end 30. The front end has a front coupling 22 configured to mate with a front clamping member 102 of the bicycle pedal. The rear end has a rear coupling 32 configured to mate with a rear clamping member 104 of the bicycle pedal.

The bicycle pedal adapter is configured to be clicked onto the bicycle pedal by hand 150 and to be uncoupled from the bicycle pedal by hand or with a tool 90. The bicycle pedal adapter has a foot support surface 28 which faces upwards. The main body does not comprise a plurality of coupling holes 210, 310 via which the bicycle pedal adapter can be connected to a bicycle shoe via a connecting member, as shown in the prior art FIGS. 14 and 15.

At least one hole or recess 60 is provided in the bicycle pedal adapter. The at least one hole or recess is configured to be engaged by a decoupling tool 90. The at least one hole or recess is provided in a side 66, 68 and extends in particular from one side 66 to the opposite side 68. For decoupling reasons, the hole or recess is positioned in a rear part of the main body. Said position creates the desired arm for decoupling the bicycle pedal adapter with the use of the decoupling tool 90.

The rear coupling 32 has stopping sections 26. The stopping sections are integrally connected to the main body and are triangular shaped sections, with a rounded corner. When viewed in top view, the stopping sections 26 extend at an angle α with a lateral plane 27.

The angle α lies between 10 and 45 degrees, more in particular between 20 and 30 degrees.

The front coupling 22 has a first protrusion 24 which extends in a downward and forward direction from the main body of the bicycle pedal adapter.

Figure 1A:
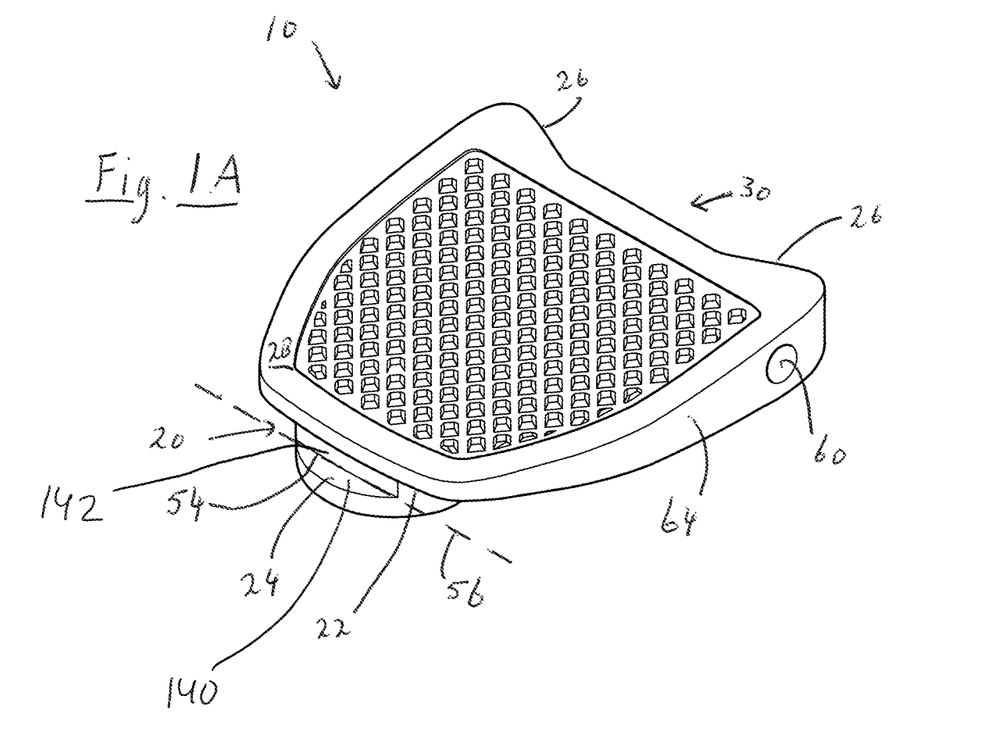
FIG. 1A shows a general isometric view from above of an embodiment of the invention.
Figure 1B:
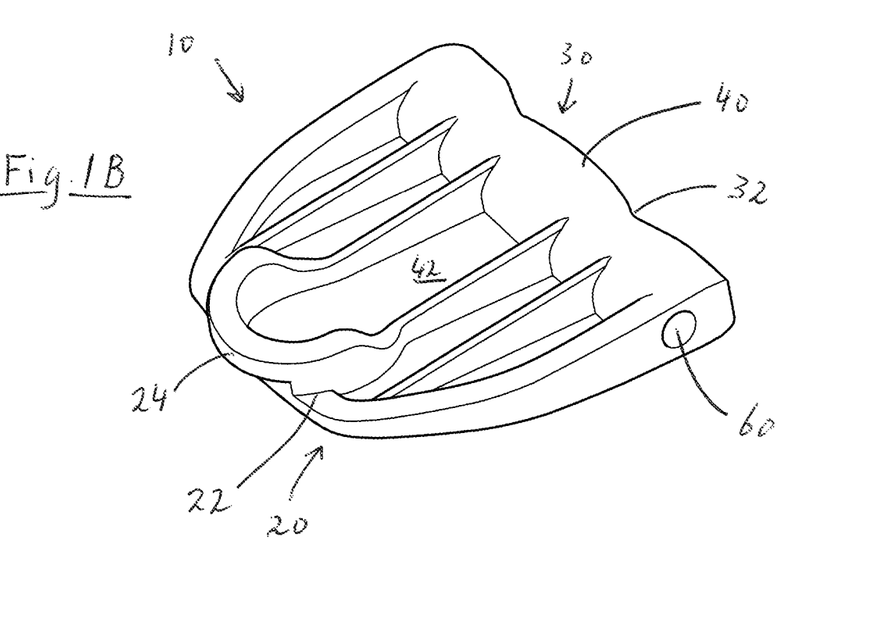
FIG. 1B shows a general isometric view from below of an embodiment of the invention.
Figure 2A:
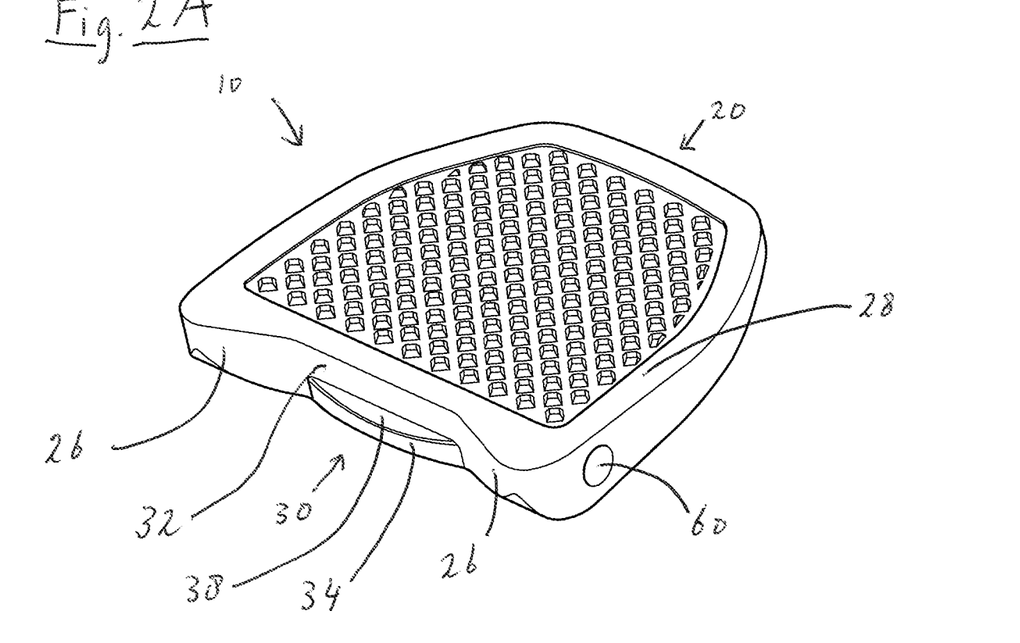
FIG. 2A shows a general isometric view from above of an embodiment of the invention.
Figure 2B:
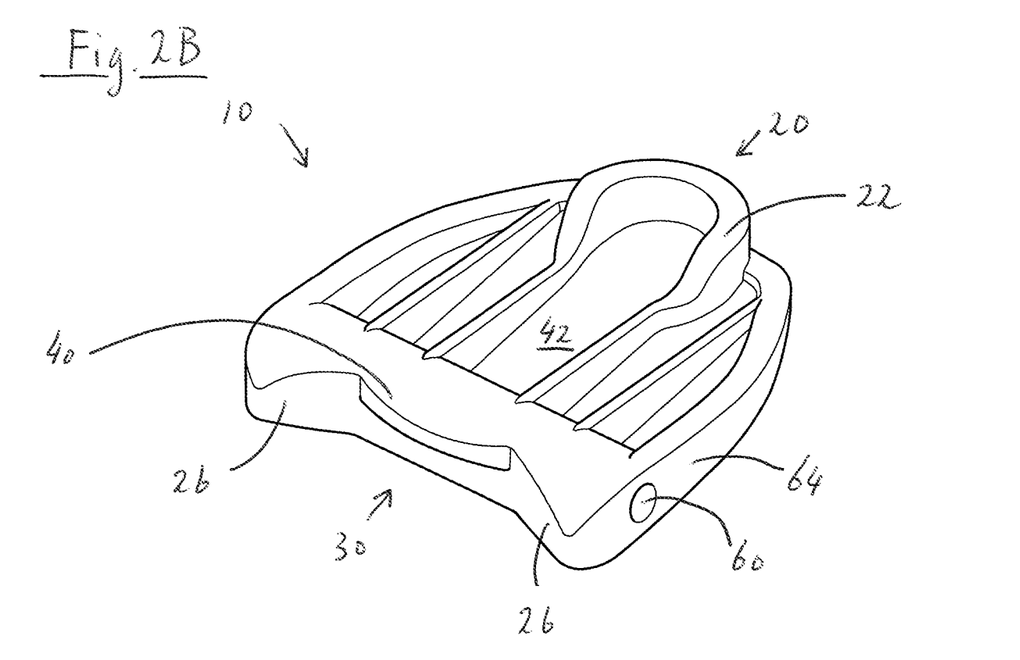
FIG. 2B shows a general isometric view from below of an embodiment of the invention.

The first protrusion 24 has a shape of a part of a circle, in particular a semi-circular shape when viewed in bottom view. This is shown in FIG. 2.

The first protrusion 24 has an upwardly facing support surface 140 and a forwardly facing support surface 141. The upwardly facing support surface 140 and the forwardly facing support surface 141 meet along a pivot line 54 which defines a front pivot axis 56. During coupling and decoupling, the bicycle adapter pivots around the front pivot axis.

The bicycle pedal adapter has a vertical left side 66 and vertical right side 64.

Figure 5:
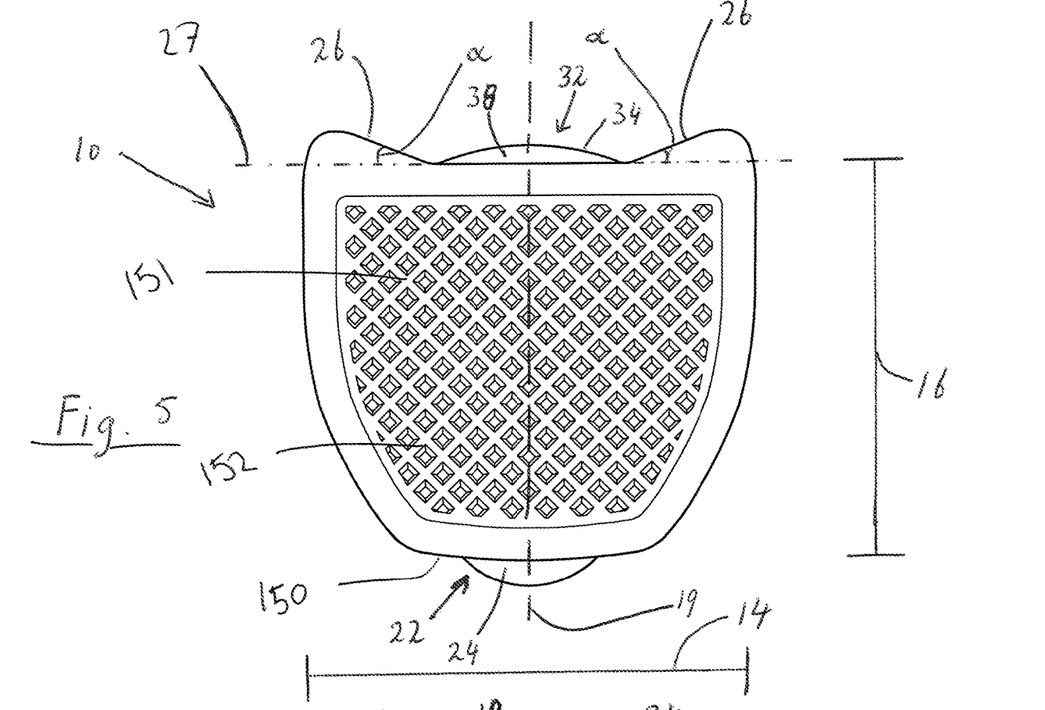
FIG. 5 shows a top view of an embodiment of the invention.
Figure 6:
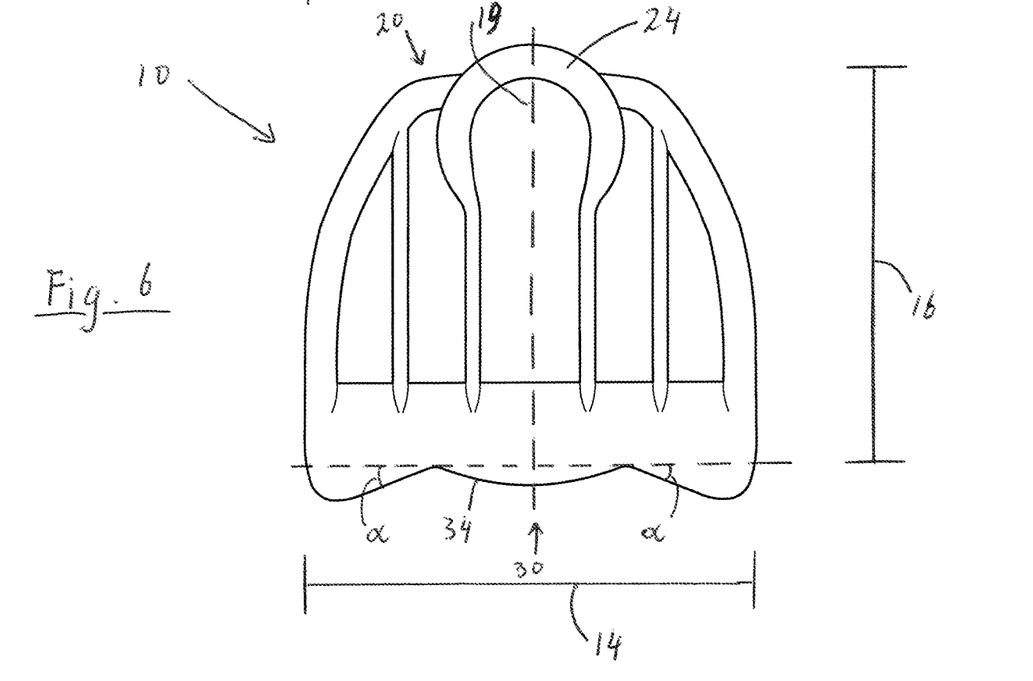
FIG. 6 shows a bottom view of an embodiment of the invention.
Figure 7:
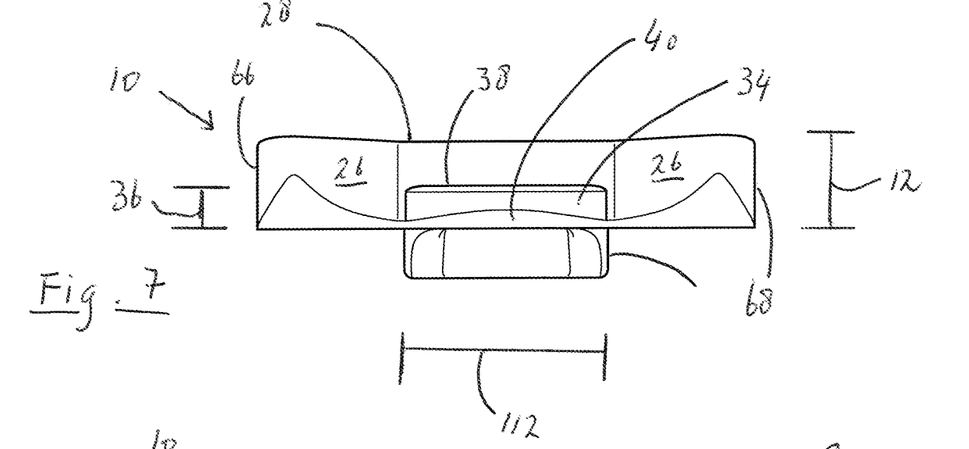
FIG. 7 shows rear view of an embodiment of the invention.
Figure 8:
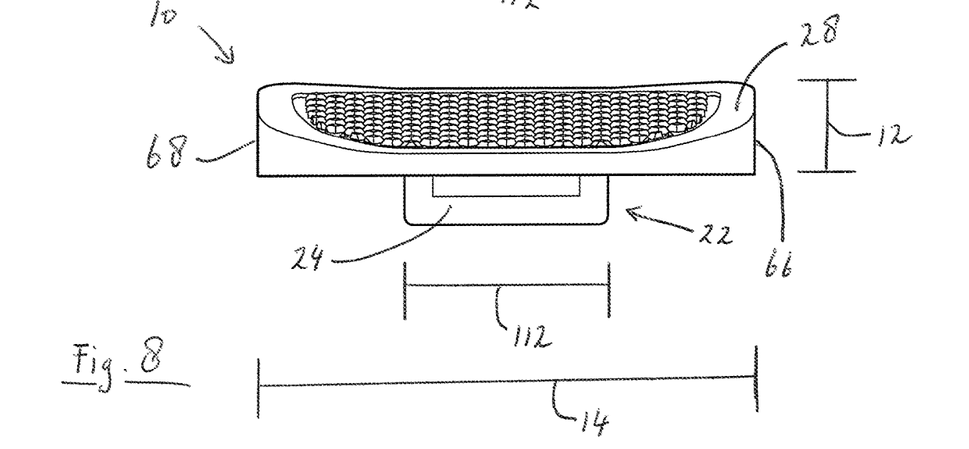
FIG. 8 shows a front view of an embodiment of the invention.

Turning to FIGS. 5 and 7, the rear coupling 32 comprises a second protrusion 34. When seen in top view, the second protrusion 34 is located between the stopping sections 26. In top view the second protrusion extends rearward from the main body of the bicycle pedal adapter. In top view, the second protrusion has a width which is smaller than 40 percent of a width of the main body.

The second protrusion is provided at a lower half of the bicycle pedal adapter when seen in rear view. A protrusion height 36 of the second protrusion is less than half of the height 12 of the bicycle pedal adapter. The second protrusion is configured to mate with the rear clamping member 104.

An upper side of the second protrusion comprises an engagement surface 38 which faces upwards. In use, the rear clamping member engages the engagement surface 38, thereby maintaining the position of the bicycle pedal adapter.

When viewed in top view the second protrusion has a curved shape, wherein an apex of the curve is located on a vertical longitudinal midplane 19 of the bicycle pedal adapter.

The stopping sections 26 and second protrusion 34 together form a substantially W-shaped rear end, when seen in top and/or bottom view.

The rear coupling 32 has a guiding surface 40 at a lower section of the second protrusion when viewed in cross-sectional side view taken along the longitudinal midplane 19.

The shown embodiments of the bicycle pedal adapter are all single integral bodies. A single integral body provides a robust construction. Keeping in mind an easy way of manufacturing, the bicycle pedal adapter may be made from a single material. Plastic, aluminium or titanium could be chosen as single material for their positive material properties. The stiffness and strength to mass ratios of these materials are suited for a product such as the bicycle pedal adapter. The bicycle pedal adapter can be manufactured with injection moulding.

The foot support surface 28 can be provided with a textured surface. The textured surface prevents slipping between the user's shoe and the bicycle pedal adapter. Another option would be to provide anti-slip material on the foot support surface.

The single material has a density of less than 4 g/cm3. This density leads to a total weight of less than 50 gram, in particular less than 40 gram, more in particular less than 30 gram for the bicycle pedal adapter. In case of hard plastic, the density may be lower than 2 g/cm3.

When viewed in top view the bicycle pedal adapter is substantially symmetric about the vertical longitudinal midplane 19. A symmetric product is convenient for the user, because the user does not have to worry about matching the correct adapter with the corresponding pedal (left or right). A set of bicycle pedal adapters are identically shaped.

Figure 9:
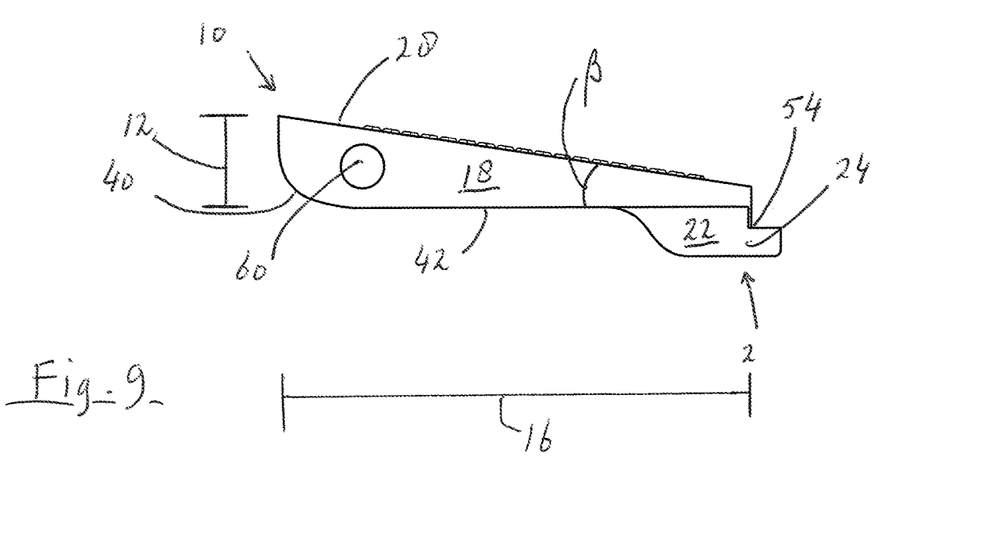
FIG. 9 shows a side view of an embodiment of the invention.
Figure 10:
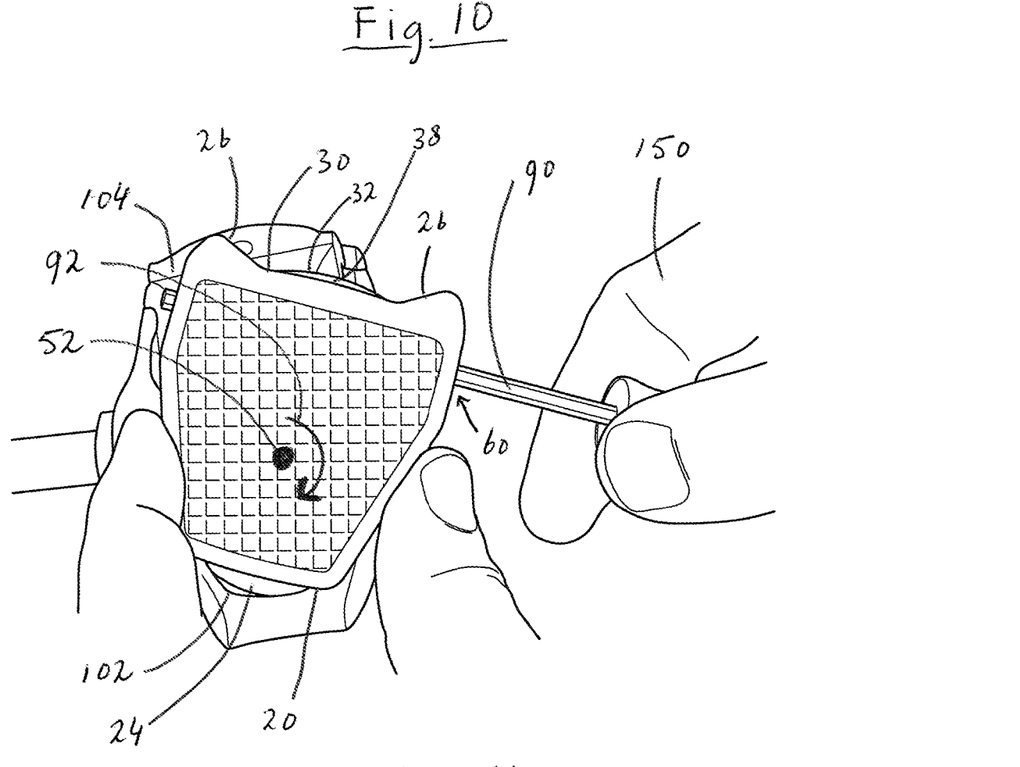
FIG. 10 shows a top view of a decoupling method of the invention.

Turning to FIGS. 9 and 10, in side view the main body 18 has a substantially flat foot support surface 28. In the same view the main body 18 also has a substantially flat bottom side 42. The foot support surface furthermore follows a straight line. In side view, the main body 18 increases in height from the front end to the rear end. The foot support surface 28 and the flat bottom side 42 are oriented at an angle β of about 4-10 degrees with respect to one another.

The bicycle pedal adapter is configured to be decoupled by firstly pivoting the bicycle pedal adapter around a pivot axis 52 which extends perpendicular to the foot support surface and by subsequently lifting the bicycle pedal adapter from the pedal.

Figure 3:
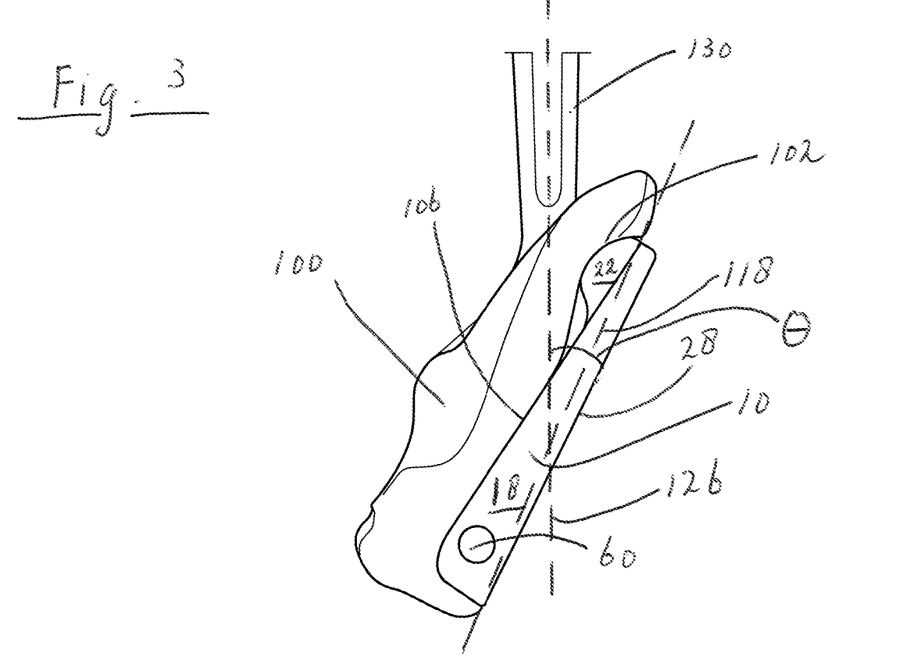
FIG. 3 shows a side view of an embodiment of an assembly of a pedal and a bicycle pedal adapter of the invention in a stable orientation.
Figure 4:
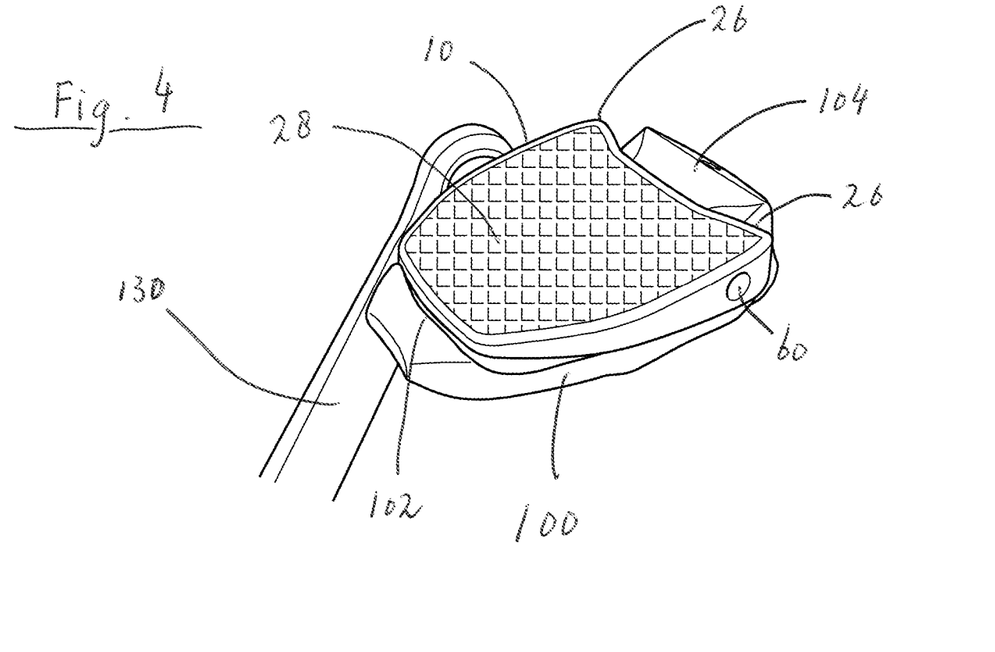
FIG. 4 shows an isometric view of the assembly of FIG. 3.
Figure 11:
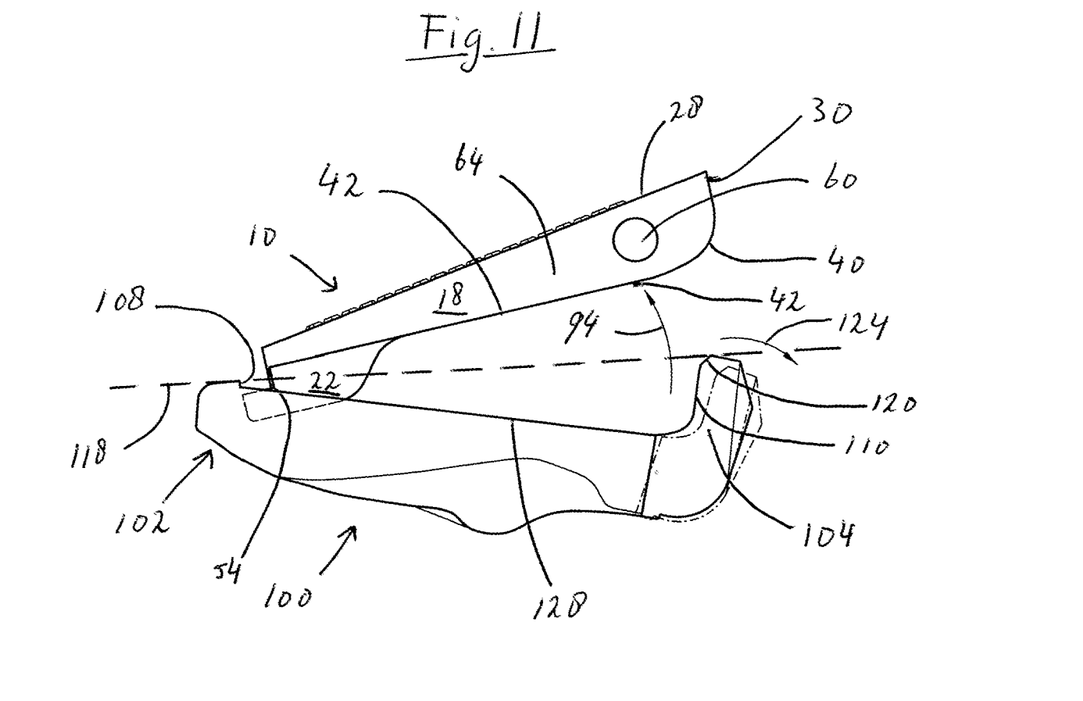
FIG. 11 shows a side view of a decoupling method of the invention.
Figure 12:
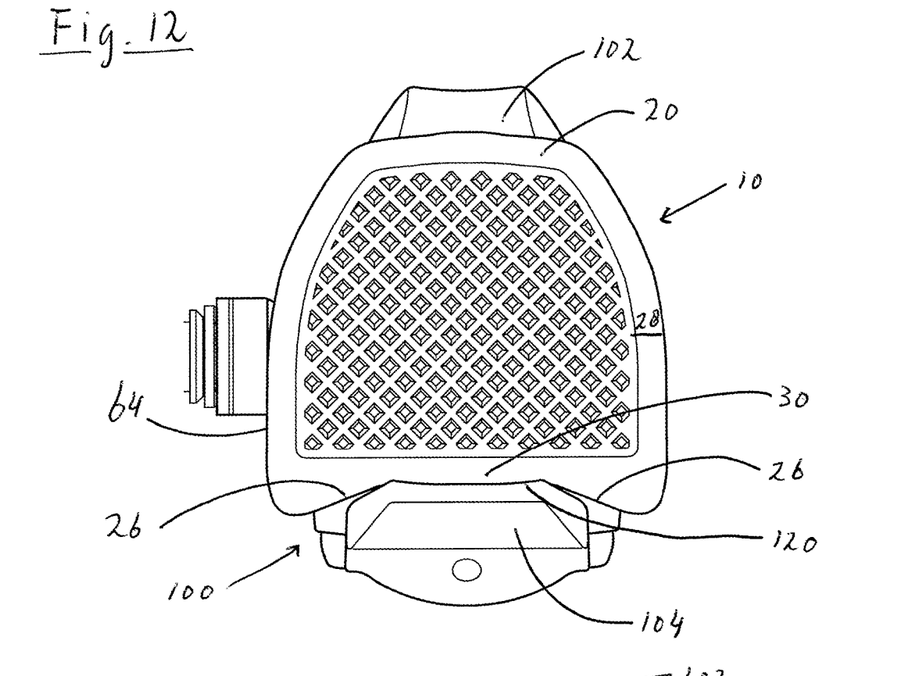
FIG. 12 shows a top view of an assembly of the invention.

Turning to FIGS. 3, 4 and 11, an assembly according to the invention is shown of the bicycle pedal adapter and a crank 130 with a bicycle pedal 100 having a cleat coupling. The cleat coupling comprises a front clamping member 102 which mates with the front coupling 22. The cleat coupling further has a rear clamping member 104 which mates with the rear coupling 32 and a central support section 106 on which a main body 18 of the bicycle pedal adapter rests.

The pedal is free to rotate relative to the crank 130. In side view the pedal and bicycle pedal adapter together rotate to a stable orientation under the influence of gravity. In the stable orientation in side view the foot support surface 28 defines an angle θ of 0-60 degrees relative to a vertical axis 126, more in particular 25-45 degrees.

The main body extends between a front section 108 and a rear section 110 of the bicycle pedal.

A foot support surface 28 of the main body is substantially flush with the bicycle pedal, more in particular substantially flush with an upper part of the front clamping member 102 and an upper part of the rear clamping member 104. Flush in this context does not mean that the upper surface needs to be exactly flush. The upper surface 28 may be raised to a maximum distance of 5 mm above a plane 118 defined by the upper parts of the front and rear clamping members.

Both front and rear couplings are constructed to prevent undesired movements of the bicycle pedal adapter during cycling. This dimension of the front coupling prevents lateral movements of the bicycle pedal adapter. The stopping sections 26 also prevents the bicycle pedal adapter from making unintended lateral movements, as well as any pivoting movements about an axis 52 which extends at right angles to the upper surface. The clamping members prevent movements away from the plane defined by the central support section.

The bicycle pedal adapter comprises a guiding surface 40 between the rear end 30 and a bottom side 42 of the main body. In side view the guiding surface is curved and configured to guide the bicycle pedal adapter smoothly over an edge 120 of the rear clamping member of the bicycle pedal. The guiding surface 40 is configured to smoothly bias the rear clamping member in a rearward direction 124 when the bicycle pedal adapter is clicked onto the pedal.

The second protrusion 34 as shown in FIG. 5 is configured to mate with the rear clamping member 104. An upper side of the second protrusion comprises an engagement surface 38 configured to be engaged by the rear clamping member and to be positioned underneath the rear clamping member. The rear clamping member keeps the bicycle pedal adapter in place and prevents the bicycle pedal adapter from detaching from the central support section.

The foot support surface of the bicycle pedal adapter has a width 14 at its widest portion which is equal to the width 122 of the bicycle pedal or is larger than the width of the bicycle pedal. In the shown embodiment, the foot support surface extends outwardly over a distance of 0-5 mm to the left and to the right beyond the bicycle pedal, This is shown in respective FIGS. 8 and 13.

In the present invention it was recognized that the rear clamping member can be accessed by hand and therefore be utilized for the removal of the bicycle pedal adapter. The shoe attached to a cleat adapter prevents access to the rear clamping member. It can therefore only be removed by pivoting the shoe.

Clicking the bicycle pedal adapter 10 onto a bicycle pedal 100 having a cleat coupling can be carried out as follows:
  a) inserting the front coupling 22 of the bicycle pedal adapter under a front clamping member 102 of the cleat coupling,
  b) pivoting the rear clamping member 104 of the bicycle pedal 100 rearward, thereby creating space for the second protrusion 34, c) engaging a bottom side 62 of the bicycle pedal adapter with an upward facing contact surface 128 of a central support section 106 of the pedal, wherein the second protrusion 34 of the rear coupling of the bicycle pedal adapter is inserted underneath the rear clamping member of the bicycle pedal, d) pivoting the rear clamping member of the bicycle pedal back to its initial position thereby fixing the bicycle pedal adapter to the pedal.

Of the abovementioned steps, step b) can comprise pushing a guiding surface 40 against an edge 120 of the rear clamping member, causing the rear clamping member to move rearward. Step b) can also comprise manually pivoting the rear clamping member rearward and thereby creating the required space for the second protrusion to move past the rear clamping member.

Figure 13:
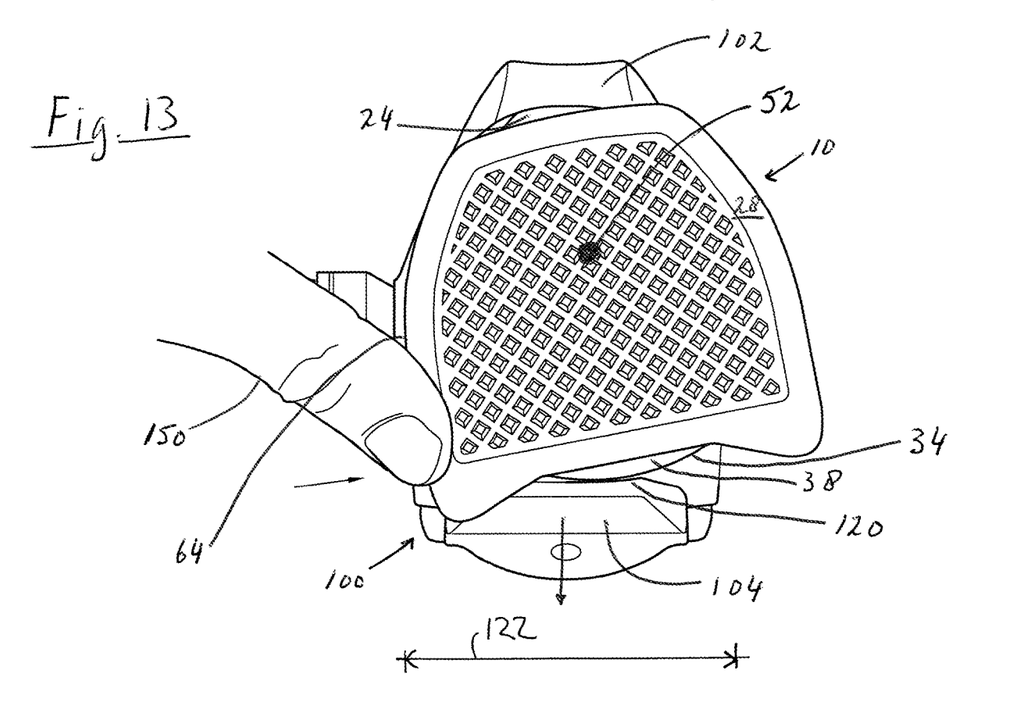
FIG. 13 shows a top view of a decoupling step of the invention.

Turning to FIGS. 10, 11 and 13, different decoupling methods are shown. The bicycle pedal adapter can be decoupled by manually pivoting the rear clamping member, thereby providing the required space for the bicycle pedal adapter to be pivoted about a front pivot axis 56. This is particularly shown in FIG. 11.

A method for decoupling the bicycle pedal adapter comprises reversing the abovementioned steps. First the rear clamping member is moved rearward. This movement is done by manually pulling the rear clamping member rearward. When the rear clamping member does no longer engage the engagement surface 38 of the second protrusion, the bicycle pedal adapter can be pivoted about the front pivot axis 56 in the second direction 94.

FIG. 10 shows a decoupling method wherein the bicycle pedal adapter comprises a hole or recess 60 in which a decoupling tool 90 can be inserted for decoupling the bicycle pedal adapter from the bicycle pedal. This method comprises the following steps:
  a) inserting a decoupling tool 90 in a hole or recess of the bicycle pedal adapter,
  b) pivoting the bicycle pedal adapter about a perpendicular pivot axis 52 by pulling the decoupling tool in a first direction 92,
  c) engaging the rear clamping member with a stopping section 26, thereby pivoting the rear clamping member backwards, providing space for the rear coupling to move upward,
  d) pulling the decoupling tool in a second direction 94, as shown in FIG. 11, wherein the second direction is substantially perpendicular to a central support section 106 of the bicycle pedal, thereby removing the bicycle pedal adapter from the pedal.

Turning to FIGS. 11 and 13, another method for decoupling the bicycle pedal adapter is shown, comprising the steps:
  a) engaging a side 64 of a rear part of the main body of the bicycle pedal adapter with a hand 150 of a user,
  b) pivoting the bicycle pedal adapter, in particular about a pivot axis 52 which extends perpendicular to the foot support surface, by manually pushing on the outer side, thereby engaging the rear clamping member with one of the stopping sections, and pivoting the rear clamping member to the rear by pushing the stopping section against it,
  c) lifting the rear end up with another hand of the user, thereby pivoting the bicycle pedal adapter about a front pivot axis 56,
  d) removing the bicycle pedal adapter from the bicycle pedal.

Figure 14:
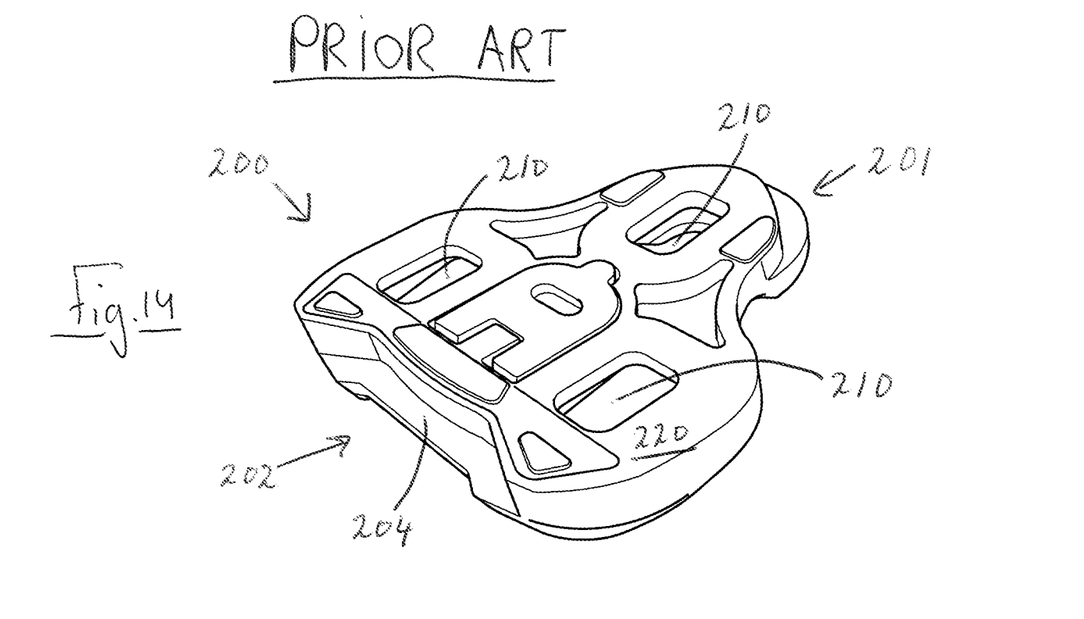
FIG. 14 shows a cleat according to the prior art.
Figure 15:
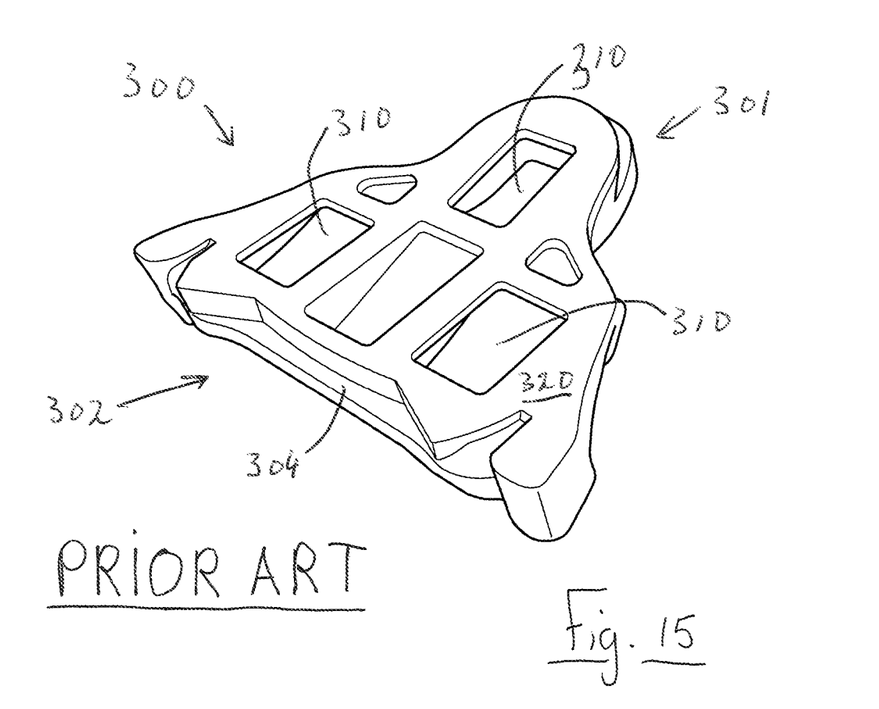
FIG. 15 shows another cleat according to the prior art.

Turning to the prior art FIGS. 14 and 15, a Look cleat 200 and a Shimano cleat 300 are shown. Both cleats have a front coupling 201, 301 and a rear coupling 202, 302. Both rear couplings 202, 302 have a protrusion having an upwardly facing engagement surface 204, 304. These engagement surfaces 204, 304 are constructed to be engaged by the rear clamping member 104 of the bicycle pedal. Compared to the invention, the engagement surfaces of the protrusions of the prior art are wider. Due to the wider engagement surfaces, the rear clamping member remains engaged for a larger pivot angle of the cleat. The larger pivot angle for decoupling of the cleat requires more strength. The present invention has constructed the engagement surface such that the desired pivot angle for decoupling is smaller compared to the existing cleats. In the end this leads to the easier decoupling of the bicycle pedal adapter from the bicycle pedal.

The coupling holes 210, 310 are used to connect the cleat to a bicycle shoe via screws. The position on the bicycle shoe where the cleat is connected has a convex surface. Therefore the cleats have a concave contact surface 220, 320. The present invention has a flat support surface 28, which is better suited for regular shoes with stiff soles.

In most of the cleats according to the prior art a certain pivotal play of the cleat adapter is possible during use for physical reasons. If a cyclist cannot easily twist his foot during cycling, it can for example cause knee injuries. In the present invention it was recognized that for the use of a shoeless cleat adapter a freedom of movement during use is in fact undesired. It has a negative effect on the control of the feet on the pedals. Therefore a cleat adapter is desired that is substantially immovable after being clicked onto a bicycle pedal. However, the user still has to be able to remove the bicycle pedal adapter. The present invention provides a solution to this problem, as described above.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The present invention further relates to the following numbered clauses:
  1. Bicycle pedal adapter (10) configured to be clicked onto a bicycle pedal (100) which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle pedal adapter comprises a main body (18) having a height (12), a width (14) and a length (16), wherein the width is more than four times the height and wherein the length is more than five times the height, and wherein the main body (18) has a front end (20) and a rear end (30), the bicycle pedal adapter (10) comprising:
  a front coupling (22) at the front end, the front coupling being configured to mate with a front clamping member (102) of the bicycle pedal and
  a rear coupling (32) at the rear end, the rear coupling being configured to mate with a rear clamping member (104) of the bicycle pedal, and
  wherein the bicycle pedal adapter is configured to be clicked onto the bicycle pedal and to be uncoupled from the bicycle pedal, and wherein the bicycle pedal adapter comprises a foot support surface (28) which faces upwards, wherein the main body does not comprise a plurality of coupling holes (210) via which the bicycle pedal adapter can be connected to a bicycle shoe via a connecting member.

2. Bicycle pedal adapter according to clause 1, wherein the rear end comprises stopping sections (26), wherein the stopping sections are integrally connected to the main body and comprise triangular shaped sections, when viewed in top view, extending away from the main body under an angle α.

3. Bicycle pedal adapter according the previous clause, wherein the angle α lies between 10 and 45 degrees, more in particular between 20 and 30 degrees.

4. Bicycle pedal adapter according to any of the preceding clauses, wherein the front coupling comprises a first protrusion (24) which extends in a downward and forward direction from the main body of the bicycle pedal adapter.

5. Bicycle pedal adapter according to the preceding clause, wherein the first protrusion has a shape of a part of a circle, in particular a semi-circular shape when viewed in bottom view.

6. Bicycle pedal adapter according to any of the preceding clauses, wherein the front coupling weighs less than 15 grams.

7. Bicycle pedal adapter according to any of the preceding clauses, wherein besides the front coupling the bicycle pedal adapter does not have any other parts protruding downward from the main body.

8. Bicycle pedal adapter according to any of clauses 2-7, wherein the rear coupling comprises a second protrusion (34) which in top view is located between the stopping sections, and wherein in top view the second protrusion extends rearward from the main body of the bicycle pedal adapter, wherein in rear view the second protrusion is provided at a lower half of the bicycle pedal adapter, wherein an upper side of the second protrusion comprises an engagement surface (38), wherein the second protrusion is configured to mate with the rear clamping member.

9. Bicycle pedal adapter according to clause 8, wherein in particular a protrusion height (36) of the second protrusion is less than half of the height of the bicycle pedal adapter.

10. Bicycle pedal adapter according to clause 8 or 9, wherein when viewed in top view the second protrusion has a curved shape, wherein an apex of the curve is located on a vertical longitudinal midplane (19) of the bicycle pedal adapter.

11. Bicycle pedal adapter according to any of the preceding clauses, wherein the rear coupling comprises a curved guiding surface (40) at a lower section of the second protrusion when viewed in cross-sectional side view.

12. Bicycle pedal adapter according to any of the preceding clauses, wherein the bicycle pedal adapter is a single integral body.

13. Bicycle pedal adapter according to any of the preceding clauses, wherein the bicycle pedal adapter is an integral body of a single material or an integral body of a single material having only an antislip material on the foot support surface and no other materials.

14. Bicycle pedal adapter according to any of the preceding clauses, wherein the single material is plastic, aluminium or titanium.

15. Bicycle pedal adapter according to any of the preceding clauses, wherein the single material has a density of less than 4 g/cm3, and in particular less than 2 g/cm3.

16. Bicycle pedal adapter according to any of the preceding clauses, having a total weight of less than 50 gram, in particular less than 40 gram, more in particular less than 30 gram.

17. Bicycle pedal adapter according to any of the preceding clauses, wherein when viewed in top view the bicycle pedal adapter is substantially symmetric about the vertical longitudinal midplane.

18. Bicycle pedal adapter according to any of the preceding clauses, wherein in side view the main body has a substantially flat foot support surface.

19. Bicycle pedal adapter according to any of the preceding clauses, wherein in side view the main body has a substantially flat bottom side (42).

20. Bicycle pedal adapter according to any of the preceding clauses, wherein in side view the foot support surface follows a straight line.

21. Bicycle pedal adapter according to any of the preceding clauses, wherein in side view the main body increases in height from the front end to the rear end.

22. Bicycle pedal adapter according to any of the preceding clauses, wherein the main body has a height of less than 15 mm.

23. Bicycle pedal adapter according to any of the preceding clauses, wherein the bicycle pedal adapter is manufactured with injection moulding.

24. Bicycle pedal adapter according to any of the preceding clauses, wherein the foot support surface is textured or provided with anti-slip material.

25. Bicycle pedal adapter according to any of the preceding clauses, wherein at least one hole or recess (60) is provided in the bicycle pedal adapter, in particular in a side of the bicycle pedal adapter, wherein the at least one hole or recess is configured to be engaged by a decoupling tool (90).

26. Bicycle pedal adapter according to any of the preceding clauses, wherein the at least one hole or recess is provided in a side and extends in particular from one side (64) to the opposite side.

27. Bicycle pedal adapter according to any of the preceding clauses, wherein the hole or recess is positioned in a rear part of the main body.

28. Bicycle pedal adapter according to any of the preceding clauses, wherein in bottom view and/or top view the rear end has a substantially W-shape.

29. Bicycle pedal adapter according to any of the preceding clauses, wherein the bicycle pedal adapter is configured to be decoupled by firstly pivoting the bicycle pedal adapter around a perpendicular pivot axis (52).

30. Bicycle pedal adapter according to any of the preceding clauses 4-29, wherein the first protrusion (24) has an upwardly facing support surface (140) and a forwardly facing support surface (141), wherein the upwardly facing support surface (140) and the forwardly facing support surface (141) meet along a pivot line (54) which defines a front pivot axis (56).
31. Bicycle pedal adapter according to any of the preceding clauses, wherein the bicycle pedal adapter has a vertical left side (66) and a vertical right side (68).
32. Bicycle pedal adapter according to any of the preceding clauses, wherein in top view a rear part (152) of the main body has a uniform width, and wherein a front part (152) of the main body has a width which decreases toward a front end (150) of the main body.
33. Assembly of the bicycle pedal adapter according to any of the preceding clauses and a crank (130) with a bicycle pedal (100) having a cleat coupling, wherein the cleat coupling comprises a front clamping member (102) which mates with the front coupling (22) and a rear clamping member (104) which mates with the rear coupling (32) and a central support section (106) on which a main body (18) of the bicycle pedal adapter rests.
34. Assembly according to clause 33, wherein the main body extends between a front section (108) and a rear section (110) of the bicycle pedal.
35. Assembly according to any of clauses 33-34, wherein in side view the bicycle pedal adapter does have any part which extends to below the bicycle pedal.
36. Assembly according to any of clauses 33-35, wherein in side view the bicycle pedal adapter does not engage a bottom side of the bicycle pedal.
37. Assembly according to any of clauses 33-36, wherein a foot support surface of the main body is substantially flush with the bicycle pedal.
38. Assembly according to any of clauses 33-37, wherein in side view the foot support surface is located less than 5 mm above a plane (118) defined by the front and rear clamping members.
39. Assembly according to any of clauses 33-38, wherein the bicycle pedal adapter comprises a guiding surface (40) between the rear end (30) and a bottom side (42) of the main body, wherein the guiding surface is curved and configured to guide the bicycle pedal adapter smoothly over an edge (120) of the rear clamping member of the bicycle pedal.
40. Assembly according to any of clauses 33-39, wherein the rear coupling (32) comprises a second protrusion (34) which in top view is located between the stopping sections, and wherein in top view the second protrusion extends rearward from the main body (18) of the bicycle pedal adapter, wherein in rear view the second protrusion is provided at a lower half of the bicycle pedal adapter, wherein the second protrusion is configured to mate with the rear clamping member (104), wherein an upper side of the second protrusion comprises an engagement surface (38) configured to be engaged by the rear clamping member.
41. Assembly according to any of clauses 33-40, wherein the foot support surface of the bicycle pedal adapter has a width (14) at its widest portion which is equal to the width (122) of the bicycle pedal or is larger than the width of the bicycle pedal, in which case the foot support surface extends outwardly over a distance of 0-5 mm to the left and to the right beyond the bicycle pedal.
42. Assembly according to any of clauses 33-41, wherein the bicycle pedal adapter is configured to be decoupled by manually by pivoting the rear clamping member, thereby providing the required space for the bicycle pedal adapter to be pivoted about a front pivot axis (56).
43. Assembly according to any of clauses 33-42, wherein the bicycle pedal adapter comprises a hole or recess (60) in a left side and/or a right side in which a decoupling tool (90) can be inserted for decoupling the bicycle pedal adapter from the bicycle pedal.
44. Assembly according to any of clauses 33-43, wherein a guiding surface (40) is configured to smoothly bias the rear clamping member in a rearward direction (124) when the bicycle pedal adapter is clicked onto the pedal.
45. Assembly according to any of clauses 33-44, wherein the pedal is free to rotate relative to the crank (130) and wherein in side view the pedal and bicycle pedal adapter together rotate to a stable orientation under the influence of gravity, wherein in the stable orientation in side view the foot support surface defines an angle (θ) of 0-60 degrees relative to a vertical axis (126), more in particular 25-45 degrees.
46. Assembly according to any of clauses 33-45, wherein the bicycle pedal adapter extends over the front clamping member of the bicycle pedal.
47. Method for clicking the bicycle pedal adapter according to any of clauses 1-32 onto a bicycle pedal (100) having a cleat coupling, the method comprising:
    a) inserting the front coupling (22) of the bicycle pedal adapter under a front clamping member (102) of the cleat coupling,
    b) pivoting the rear clamping member (104) of the bicycle pedal (100) rearward, thereby creating space for the second protrusion (34),
    c) engaging a bottom side (62) of the bicycle pedal adapter with an upward facing contact surface (128) of a central support section (106) of the pedal, wherein the second protrusion (34) of the rear coupling of the bicycle pedal adapter is inserted underneath the rear clamping member of the bicycle pedal,
    d) pivoting the rear clamping member of the bicycle pedal back to its initial position thereby fixing the bicycle pedal adapter to the pedal.
48. Method according to the previous method clause, wherein step b) comprises pushing a guiding surface (40) against an edge (120) of the rear clamping member, causing the rear clamping member to move rearward.
49. Method for decoupling the bicycle pedal adapter according to any of the preceding clauses 1-32 onto a pedal having a cleat coupling, the method comprising reversing the steps of method clause 42.
50. Method for decoupling the bicycle pedal adapter according to any of clauses 1-32 from a bicycle pedal having a cleat coupling, the method comprising:
    a) inserting a decoupling tool (90) in a hole or recess of the bicycle pedal adapter,
    b) pivoting the bicycle pedal adapter about a perpendicular pivot axis (52) by pulling the decoupling tool in a first direction (92),
    c) engaging the rear clamping member with a stopping section (26), thereby pivoting the rear clamping member backwards, providing space for the rear coupling to move upward, d) pulling the decoupling tool in a second direction (94), wherein the second direction is substantially perpendicular to a central support section (106) of the bicycle pedal, thereby removing the bicycle pedal adapter from the pedal.

51. Method for decoupling the bicycle pedal adapter according to any of clauses 1-32 from a bicycle pedal having a cleat coupling, the method comprising:
 a) engaging a side (64) of a rear part of the main body of the bicycle pedal adapter with a hand (150) of a user,
 b) pivoting the bicycle pedal adapter, in particular about a vertical axis (126), by manually pushing on the outer side, thereby engaging the rear clamping member with one of the stopping sections, and pivoting the rear clamping member to the rear by pushing the stopping section against it,
 c) lifting the rear end up with another hand of the user, thereby pivoting the bicycle pedal adapter about a front pivot axis,
 d) removing the bicycle pedal adapter from the bicycle pedal

The invention claimed is:

1. Bicycle pedal adapter configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle adapter is constructed and arranged to be used without a toe-clip, and wherein the bicycle adapter is free of a connecting member for connecting a toe-clip thereto, wherein the bicycle pedal adapter is flat, wherein the bicycle pedal adapter comprises a main body having a height, a width and a length, wherein the width is more than four times the height and wherein the length is more than five times the height, and wherein the main body has a front end and a rear end, the bicycle pedal adapter comprising:
 a front coupling at the front end, the front coupling being configured to mate with a front clamping member of the bicycle pedal, wherein the front coupling comprises a first protrusion which extends in a downward and forward direction from the main body of the bicycle pedal adapter, and
 a rear coupling at the rear end, the rear coupling being configured to mate with a rear clamping member of the bicycle pedal, and
 wherein the bicycle pedal adapter is configured to be clicked onto the bicycle pedal and to be uncoupled from the bicycle pedal, and wherein the bicycle pedal adapter comprises a foot support surface which faces upwards, wherein the main body does not comprise a plurality of coupling holes via which the bicycle pedal adapter can be connected to a bicycle shoe via a connecting member, wherein the bicycle pedal adapter does not have a toe-clip.

2. Bicycle pedal adapter according to claim 1, wherein the rear end comprises stopping sections, wherein the stopping sections are integrally connected to the main body and comprise triangular shaped sections, when viewed in top view, extending away from the main body under an angle α, wherein the rear coupling comprises a second protrusion which in top view is located between the stopping sections, wherein the stopping sections and second protrusion together form a substantially W-shaped rear end, when seen in bottom view.

3. Bicycle pedal adapter according to claim 2, wherein the rear coupling comprises a curved guiding surface at a lower section of the second protrusion when viewed in cross-sectional side view.

4. Bicycle pedal adapter according to claim 2, wherein in top view the second protrusion extends rearward from the main body of the bicycle pedal adapter, wherein in rear view the second protrusion is provided at a lower half of the bicycle pedal adapter, wherein an upper side of the second protrusion comprises an engagement surface, wherein the second protrusion is configured to mate with the rear clamping member.

5. Bicycle pedal adapter according to claim 4, wherein the stopping sections and the second protrusion together form a substantially W-shaped rear end, when seen in top view.

6. Bicycle pedal adapter according to claim 2, wherein when viewed in top view the second protrusion has a curved shape, wherein an apex of the curve is located on a vertical longitudinal midplane of the bicycle pedal adapter.

7. Bicycle pedal adapter according to claim 2, wherein the angle α lies between 10 and 45 degrees.

8. Bicycle pedal adapter according to claim 1, wherein besides the front coupling the bicycle pedal adapter does not have any other parts protruding downward from the main body.

9. Bicycle pedal adapter according to claim 1, wherein the bicycle pedal adapter is an integral body of a single material or an integral body of a single material having only an antislip material on the foot support surface and no other materials.

10. Bicycle pedal adapter according to claim 1, wherein when viewed in top view the bicycle pedal adapter is substantially symmetric about the vertical longitudinal midplane.

11. Bicycle pedal adapter according to claim 1, wherein in side view the main body has a substantially flat foot support surface.

12. Bicycle pedal adapter according to claim 1, wherein in side view the main body increases in height from the front end to the rear end.

13. Bicycle pedal adapter according to claim 1, wherein the main body has a height of less than 15 mm.

14. Bicycle pedal adapter according to claim 1, wherein the foot support surface is textured or provided with anti-slip material.

15. Bicycle pedal adapter according to claim 1, wherein at least one hole or recess is provided in the bicycle pedal adapter wherein the at least one hole or recess is configured to be engaged by a decoupling tool.

16. Bicycle pedal adapter according to claim 1, wherein the at least one hole or recess is provided in a side.

17. Bicycle pedal adapter according to claim 1, wherein the hole or recess is positioned in a rear part of the main body.

18. Bicycle pedal adapter according to claim 1, wherein in top view a rear part of the main body has a uniform width, and wherein a front part of the main body has a width which decreases toward a front end of the main body.

19. Bicycle pedal adapter configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle adapter is constructed and arranged to be used without a toe-clip, and wherein the bicycle adapter is free of a connecting member for connecting a toe-clip thereto, wherein the bicycle pedal adapter is flat, wherein the bicycle pedal adapter comprises a main body having a height, a width and a length, wherein the width is more than four times the height and wherein the length is more than five times the height, and wherein the main body has a front end and a rear end, the bicycle pedal adapter comprising:
- a front coupling at the front end, the front coupling being configured to mate with a front clamping member of the bicycle pedal, and
- a rear coupling at the rear end, the rear coupling being configured to mate with a rear clamping member of the bicycle pedal, and
  - wherein the bicycle pedal adapter is configured to be clicked onto the bicycle pedal and to be uncoupled from the bicycle pedal, and wherein the bicycle pedal adapter comprises a foot support surface which faces upwards, wherein the main body does not comprise a plurality of coupling holes via which the bicycle pedal adapter can be connected to a bicycle shoe via a connecting member, wherein the bicycle pedal adapter does not have a toe-clip,
- wherein in bottom view and/or top view the rear end has a substantially W-shape.

20. Bicycle pedal adapter configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle adapter is constructed and arranged to be used without a toe-clip, and wherein the bicycle adapter is free of a connecting member for connecting a toe-clip thereto, wherein the bicycle pedal adapter is flat, wherein the bicycle pedal adapter comprises a main body having a height, a width and a length, wherein the width is more than four times the height and wherein the length is more than five times the height, and wherein the main body has a front end and a rear end, the bicycle pedal adapter comprising:
- a front coupling at the front end, the front coupling being configured to mate with a front clamping member of the bicycle pedal, and
- a rear coupling at the rear end, the rear coupling being configured to mate with a rear clamping member of the bicycle pedal, and
  - wherein the bicycle pedal adapter is configured to be clicked onto the bicycle pedal and to be uncoupled from the bicycle pedal, and wherein the bicycle pedal adapter comprises a foot support surface which faces upwards, wherein the main body does not comprise a plurality of coupling holes via which the bicycle pedal adapter can be connected to a bicycle shoe via a connecting member, wherein the bicycle pedal adapter does not have a toe-clip, wherein the rear end comprises stopping sections, wherein the stopping sections are integrally connected to the main body and comprise triangular shaped sections, when viewed in top view, extending away from the main body under an angle $\alpha$, wherein the rear coupling comprises a second protrusion which in top view is located between the stopping sections, wherein the stopping sections and second protrusion together form a substantially W-shaped rear end, when seen in bottom view.

\* \* \* \* \*